United States Patent [19]
Kaneko et al.

[11] Patent Number: 6,035,137
[45] Date of Patent: Mar. 7, 2000

[54] TAKING LENS DRIVE UNIT

[75] Inventors: Keiji Kaneko; Hisao Takemae, both of Saitama, Japan

[73] Assignee: Fuji Photo Optical Co., Ltd., Saitama, Japan

[21] Appl. No.: 09/158,834

[22] Filed: Sep. 23, 1998

[30] Foreign Application Priority Data

Sep. 24, 1997 [JP] Japan ..................................... 9-258810
Nov. 17, 1997 [JP] Japan ..................................... 9-315651

[51] Int. Cl.⁷ ............................. G03B 17/00; G02B 15/14
[52] U.S. Cl. ................................................. 396/76; 396/86
[58] Field of Search .................................. 396/85, 86, 87, 396/76; 359/696, 697; 348/358

[56] References Cited

U.S. PATENT DOCUMENTS

| | | | |
|---|---|---|---|
| 3,834,796 | 9/1974 | Komine | 359/697 |
| 3,940,777 | 2/1976 | Komine | 396/85 |
| 4,937,602 | 6/1990 | Himuro et al. | 396/76 |
| 5,189,458 | 2/1993 | Miyamoto et al. | 396/76 |

*Primary Examiner*—W.B. Perkey

[57] ABSTRACT

If a seesaw switch and a quick zoom switch means are operated concurrently, the seesaw switch takes priority. If the quick zoom switch is operated by mistake while the seesaw switch is operated, the operation of the quick zoom switch is invalidated. The seesaw switch continues the operation without suspending the photography. While the seesaw switch is operated, the taking lens is moved with a set maximum zoom rate being the upper limit. When the taking lens moves in accordance with the operation of the quick zoom switch, the set maximum rate is cancelled so that the taking lens can be zoomed at a preset zoom rate. Consequently, the zooming is performed quickly in accordance with the operation of the quick zoom switch.

10 Claims, 6 Drawing Sheets

TAKING LENS DRIVE UNIT

BACKGROUND OF THE INVENTION

1. Field of the Invention

The present invention relates generally to a taking lens drive unit, and more particularly to a taking lens drive unit which drives a zoom lens for use in an ENG camera, etc.

2. Description of Related Art

In the ENG camera, a lens drive unit is attached to the side of a lens barrel. A focus drive motor, a zoom drive motor, an iris drive motor, etc. are arranged in the drive unit. The rotational driving force of each motor is transmitted to a focus ring, a zoom ring and an iris ring in the lens barrel through a gear transmission mechanism.

When a cameraman takes a picture with the ENG camera on the shoulder, he or she inserts four fingers (other than the thumb) of the right hand into a grip band attached to the side of the drive unit to hold the lens barrel, and grips the focus ring at the end of the lens with the left hand to manually adjust a focus. The cameraman also manipulates a zoom seesaw control switch (hereinafter referred to as a seesaw switch) with the forefinger and the middle finger (or the ring finger) of the right hand, and manipulates a VTR switch with the thumb of the right hand.

In another conventional drive unit, a switch means (a control button) is provided in proximity to the VTR switch. Pressing the control button with the thumb of the right hand causes a zoom lens to be zoomed toward a telephoto end (or a wide end), and releasing the control button returns the zoom lens to the original position (the zoom position before the button is pressed). This function will hereinafter be referred to as a quick zooming.

The control button for the quick zooming (hereinafter referred to as a quick zoom switch) and the seesaw switch are constructed so that the switch pressed later can take priority during the zooming. If the quick zoom switch is pressed by mistake during the zooming with the use of the seesaw switch, the quick zooming is started. Particularly because the quick zoom switch is arranged close to the VTR switch, the quick zoom switch is frequently pressed by mistake with an intention of pressing the VTR switch.

The conventional drive unit is constructed in such a way that the maximum zoom rate is set by means of a maximum zoom rate control, etc., and the rate of the quick zooming is associated with the maximum zoom rate. The quick zooming is performed at the rate which is set by means of the maximum zoom rate control. Accordingly, if the maximum zoom rate is low, the quick zooming is performed slowly, and it is impossible to perform the quick zooming quickly.

SUMMARY OF THE INVENTION

The present invention has been developed in view of the above-described circumstances, and has as its object the provision of a taking lens drive unit which continues the zooming with the seesaw switch even if the quick zoom switch is operated during the zooming with the seesaw switch, and which performs the quick zooming at a high rate regardless of the setting of the maximum zooming rate.

To achieve the above-mentioned object, the present invention is directed to a taking lens drive unit which drives a movable lens system of a taking lens forward and backward along an optical axis with a zoom drive motor to perform zooming, said taking lens drive unit comprising: first control means for controlling a zooming direction and a zoom rate; second control means for executing/canceling the zooming in a preset zooming direction at a preset zoom rate; storage means for storing a zoom position when said second control means is operated to execute the zooming; returning means for returning said movable lens system of said taking lens to the zoom position stored in said storage means in response to the canceling operation of said second control means; and prioritizing means for giving priority to the operation of said first control means over the operation of said second control means.

According to the present invention, the first control means is operated to zoom the taking lens in the telephoto direction or the wide direction at the zoom rate in accordance with the operation. When the second control means is operated to execute the zooming, the current zoom position is stored in the storage means and the taking lens moves in the preset zooming direction (toward the telephoto end direction or the wide end direction) at the preset zoom rate. If the second control means is operated to cancel the zooming, the taking lens returns to the zoom position stored in the storage means (the zoom position when the second control means is operated) at the preset zoom rate.

The taking lens drive unit, which has two zoom control means, is provided with the prioritizing means which gives priority to the first control means over the second control means. If the first control means and the second control means are operated concurrently, the first control means takes priority. If the second control means is operated by mistake while the first control means is operated, the operation of the second control means is invalidated. The first control means continues the operation without suspending the photography.

To achieve the above-mentioned object, the present invention is directed to the taking lens drive unit as defined in claim 1, further comprising: setting means for setting the maximum zoom rate; and zoom rate adjusting means for adjusting the zoom rate in response to the operation of said first control means with the maximum zoom rate set by said setting means being the upper limit, and canceling the setting of said setting means at the time of zooming operation performed according to the execution/canceling of said second control means, thereby adjusting the zoom rate to said preset zoom rate.

According to the present invention, while the first control means is operated, the taking lens is zoomed with the maximum zoom rate set by the setting means being the upper limit. When the taking lens moves in accordance with the operation of the second control means (quick zooming), the rate setting by the setting means is cancelled so that the taking lens can be zoomed at a specific set rate (a preset zoom rate). This enables the zooming in accordance with the operation of the second control means quickly.

Specifically, the first control means is a seesaw switch which is capable of swinging. The operating direction of the seesaw switch is associated with the zooming direction, and the operated amount of the seesaw switch is associated with the zoom rate. The second control means is a button switch. Pressing the button switch executes the zooming in the preset zooming direction at the preset zoom rate, and releasing the button switch causes the returning means to return the movable lens system of the taking lens to the zoom position stored in the storage means.

Owing to the specific form of the apparatus, it may be difficult to attach a control member equivalent to the second control means. The control member of the second control means may also be another control member which is concerned with other functions; a return switch (RET SW), a video tape recording start switch (VTR SW), etc. In this case, a switching means is provided to switch the state of using the control member between the state of using the control member as the second control means and the state of using the control member as the return switch, etc., thus selecting the functions of the control member as the need arises.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
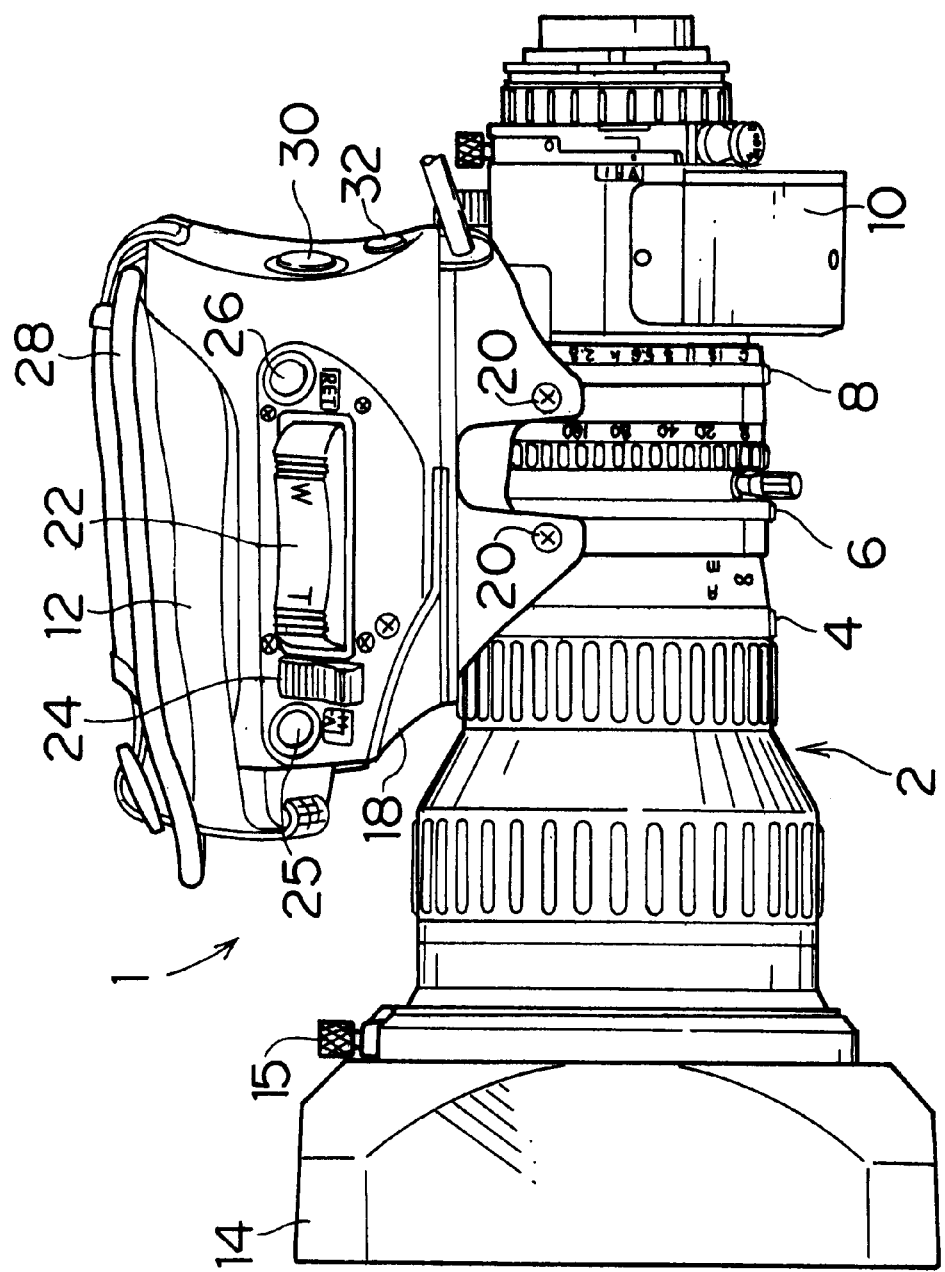
FIG. 1 is a plan view illustrating the appearance of a zoom lens apparatus for use in a TV camera, to which the taking lens drive unit of the present invention is applied.

FIG. 1 is a plan view illustrating the appearance of a zoom lens apparatus for use in a TV camera according to the present invention. The zoom lens apparatus 1 in FIG. 1 is an inner focus type zoom lens for use in a broadcast TV camera such as an ENG camera. A lens barrel 2 is provided with a focus ring 4, a zoom ring 6, and an iris ring 8, and an extender apparatus 10 is provided at the rear end of the lens barrel 2.

A drive unit 12 is attached to the side of the lens barrel 2, and the drive unit 12 drives the focus ring 4, the zoom ring 6 and the iris ring 8. Reference numeral 14 is a lens hood, and 15 is a lens hood attachment control.

The inner structure of the lens barrel 2 is not illustrated, but as is well known, a fixed focus lens, a movable focus lens, a variable frame lens system (equivalent to a movable lens system), an iris, a relay lens, etc. are provided in the lens barrel 2. An extender is arranged behind them. Rotating the focus ring 4 moves the movable focus lens forward and backward along an optical axis to adjust a focus. Rotating the zoom ring 6 moves the variable frame lens system forward and backward along the optical axis to adjust a zoom. Rotating the iris ring 8 adjusts the diameter of an iris diaphragm.

The drive unit 12 has a case 18, which is attached to the side of the lens barrel 2 with screws 20. A focus drive motor (not illustrated) is arranged in the case 18, and the focus drive motor rotates the focus ring 4 through a gear transmission mechanism (not illustrated). A zoom drive motor 40 (not illustrated in FIG. 1) is arranged in the case 18, and the zoom drive motor 40 rotates the zoom ring 6 through a gear transmission mechanism (not illustrated).

Likewise, an iris drive motor (not illustrated) is arranged in the case 18, and the iris drive motor rotates the iris ring 8 through a gear transmission mechanism (not illustrated).

A zoom seesaw control switch 22 (equivalent to the first control means and hereinafter referred to as a seesaw switch), an iris auto/manual mode changeover switch 24, an iris momentary switch 25, a return switch 26, etc. are provided at the top of the case 18.

The seesaw switch 22 is capable of swinging with the neutral position being a basis, and if the seesaw switch 22 is operated to a telephoto (T) side or a wide (W) side, the zoom ring 6 rotates to the telephoto side or the wide side. The zoom rate can be adjusted in accordance with the pressed amount (the operated amount) of the seesaw switch 22. The stronger the seesaw switch 22 is pressed, the higher the zoom rate is.

A grip band 28 is attached to the side of the case 18, and the cameraman inserts four fingers (other than the thumb) of the right hand into the grip band 28 to hold the lens barrel 2. A VTR switch 30 and a quick zoom switch 32 are arranged on the back surface of the case 18 (see FIG. 2), and the cameraman can operate the switches 30, 32 with the thumb of the right hand. The VTR switch 30 is a push button which is used for controlling the recording start/end when an image being captured is recorded on video tape.

The quick zoom switch 32 is also a push button. While the quick zoom switch 32 is pressed, the zoom lens is zoomed toward the telephoto end at a preset zoom rate (fast rate). If the quick zoom switch 32 is released, the zoom lens returns to the original position (the zoom position when the quick zoom switch 32 is pressed) at the preset zoom rate.

Figure 2:
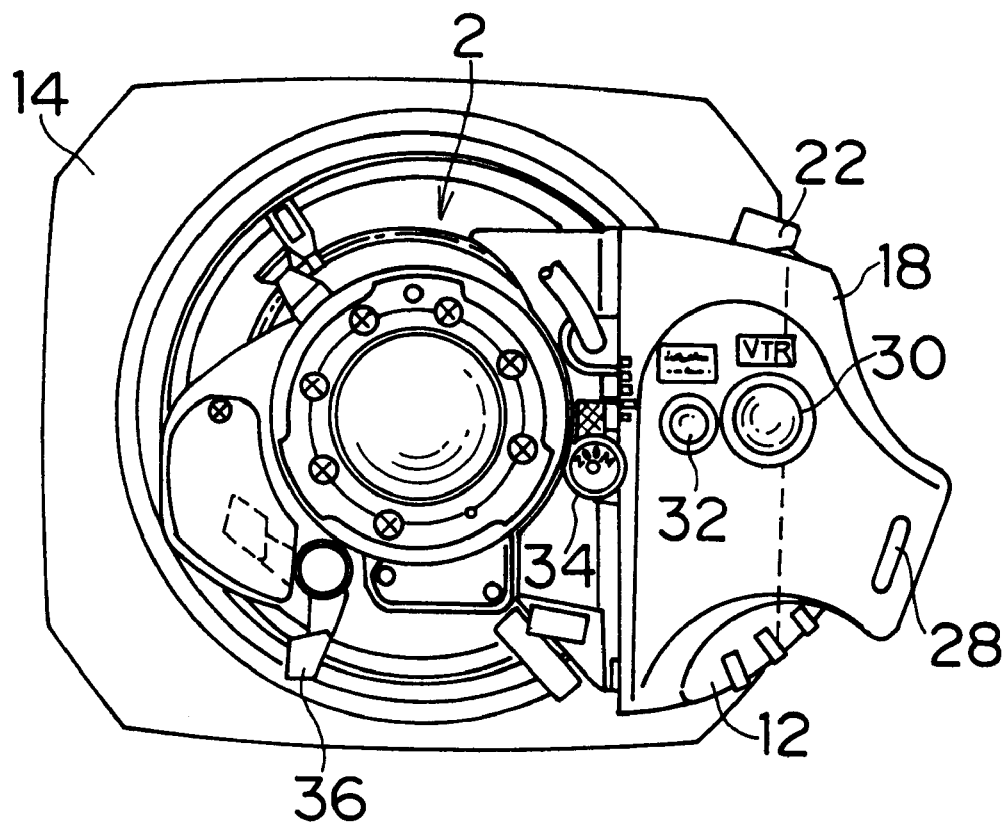
FIG. 2 is a back view of the zoom lens apparatus for use in the TV camera in FIG. 1.

A maximum zoom rate control 34 illustrated in FIG. 2 is provided on the back surface of the case 18. Rotating the control 34 sets a zoom rate (a maximum zoom rate). When the seesaw switch 22 is pressed the deepest, the zooming is performed at the maximum zoom rate. For example, the more the maximum zoom rate control 34 is rotated clockwise, the higher the maximum zoom rate is. The more the maximum zoom rate control 34 is rotated counterclockwise, the lower the maximum zoom rate is.

In FIG. 2, reference numeral 36 is an extender switching lever, and rotating the lever 36 inserts and pulls a double extender into and from a taking optical path.

Figure 3:
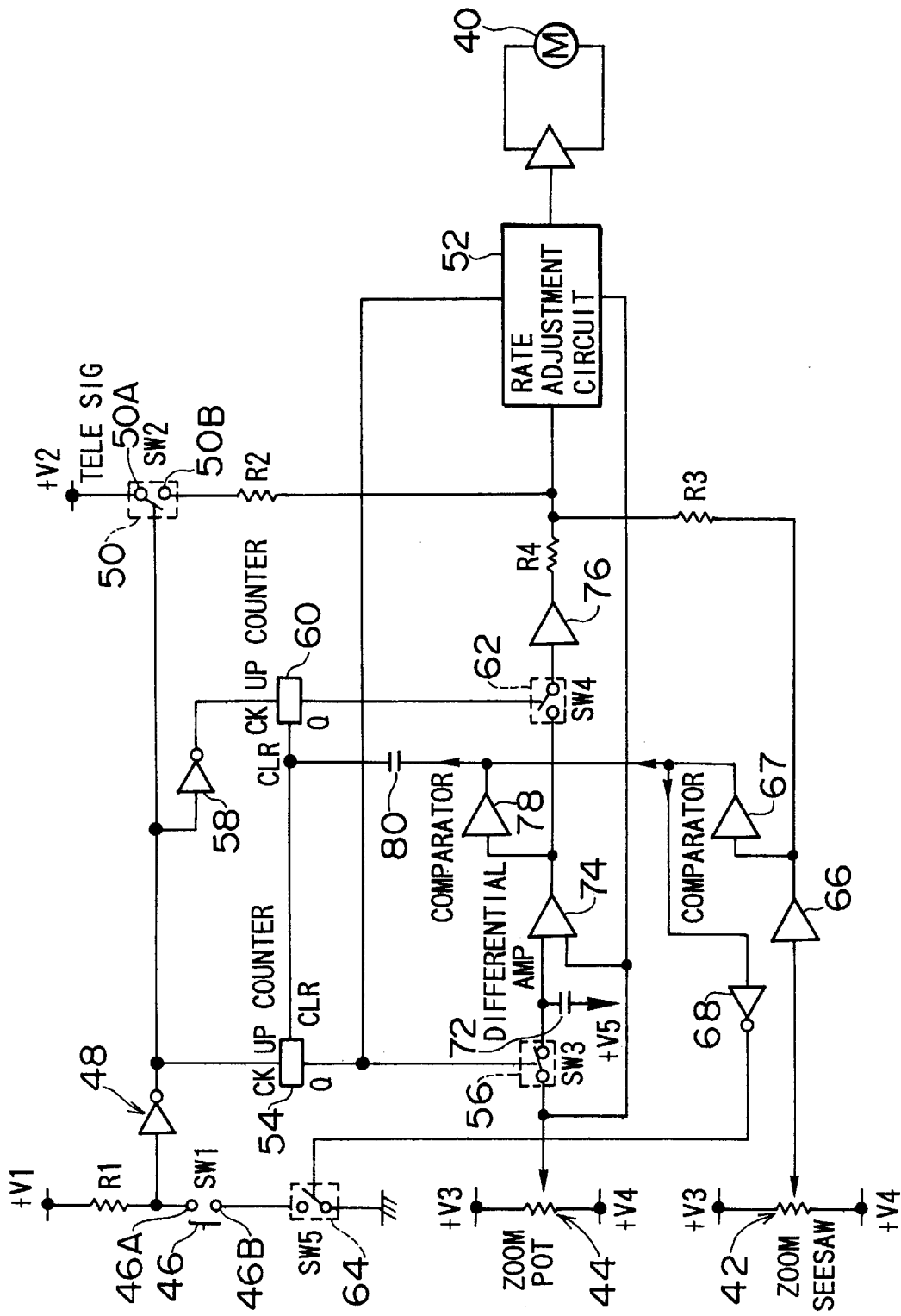
FIG. 3 is a circuit diagram showing an example of the inner structure of the taking lens drive unit.

FIG. 3 shows an example of a circuit in the taking lens drive unit. In FIG. 3, reference numeral 40 is a zoom drive motor, 42 is a potentiometer which is equivalent to the seesaw switch 22, 44 is a potentiometer which detects the position of the variable frame lens system (the zoom position), and 46 is an automatic return switch (hereinafter referred to as a switch SW1) which is equivalent to the quick zoom switch 32.

One terminal 46A of the switch SW1 connects to a voltage terminal (+V1) via a resistance R1, and also connects to an input terminal of a NOT gate 48. The output of the NOT gate 48 is divided into three, and one is guided to a relay 50 (hereinafter referred to as a switch SW2) to open and close a contact of the switch SW2 (a contact of a normally open circuit).

One terminal 50A of the switch SW2 connects to a voltage terminal (+V2), and the other terminal 50B of the SW2 connects to an input terminal of a rate adjustment circuit 52 via a resistance R2. The voltage of the voltage terminal (+V2) is equivalent to a telephoto signal (TELE SIG.) which causes the taking lens to move toward the telephoto end. When the switch SW1 is pressed to turn on the switch SW2, the telephoto signal form the voltage terminal (+V2) runs the zoom drive motor 40.

The output terminal of the NOT gate 48 also connects to an input terminal (CK) of an input-output circuit 54 such as an up counter, and the output of the input-output circuit 54 opens and closes a contact (a contact of a normally open circuit) of a relay 56 (hereinafter referred to as a switch SW3).

Further, the output of the NOT gate 48 is guided to an input terminal (CK) of a second input-output circuit 60 such as an up counter through a second NOT gate 58, and the output of the input-output circuit 60 opens and closes a contact (a contact of a normally open circuit) of a relay 62 (hereinafter referred to as a switch SW4).

The other terminal 46B of the switch SW1 connects to a ground through an electromagnetic relay 64 (hereinafter referred to as a switch SW5).

An output signal is transmitted from the potentiometer 42 of the seesaw switch 22 to the switch SW5 through an amplifier 66, a comparator 67 and a NOT gate 68. Operating the seesaw switch 22 opens the contact (a contact of a normally open circuit) of the switch SW5. This invalidates the operation of the SW1 while the seesaw switch 22 is operated, thereby prioritizing the operation of the seesaw switch 22.

The output of the potentiometer 42 of the seesaw switch 22 is transmitted to the input terminal of the rate adjustment circuit 52 via the amplifier 66 and a resistance R3. The rate adjustment circuit 52 generates a motor drive signal which realizes a zoom rate conforming to the controlled amount of the seesaw switch 22 in accordance with the maximum rate which is set by the maximum zoom rate control 34, and supplies the motor drive signal to the zoom drive motor 40. When the seesaw switch 22 is operated, the zooming is performed at the zoom rate conforming to the controlled amount of the seesaw switch 22 with the set maximum rate being the upper limit.

The potentiometer 44 regularly detects the zoom position, and the output signal from the potentiometer 44 is directly transmitted to the rate adjustment circuit 52. When the potentiometer 44 detects that the taking lens has reached the telephoto end or the wide end, the rate adjustment circuit 52 stops the zoom drive motor 40.

The output terminal of the potentiometer 44, which detects the zoom position, connects to one electrode terminal of a condenser 72 (equivalent to a storage means) via the SW3. The other electrode terminal of the condenser 72 connects to a voltage terminal (+V5). While the switch SW3 is ON, the output voltage of the potentiometer 44 is charged in the condenser 72. When the switch SW1 is turned on to turn off the SW3, the zoom position when the switch SW1 is pressed is stored in the condenser 72.

The electrode terminal of the condenser 72, which connects to a contact terminal of the switch SW3, connects to one input terminal of a differential amplifier 74, and the output signal of the potentiometer 44 is directly transmitted to the other input terminal of the differential amplifier 74. The output of the differential amplifier 74 is transmitted to the input terminal of the rate adjustment circuit 52 via the switch SW4, an amplifier 76 and a resistance R4.

Consequently, when the pressing of the switch SW1 is released to turn on the switch SW4, the zoom drive motor 40 is run in accordance with the differential output of the differential amplifier 74. When the position stored in the condenser 72 corresponds to the position detected by the potentiometer 44, the zoom drive motor 40 is stopped. Thus, releasing the switch SW1 returns the taking lens to the original zoom position (the zoom position when the switch SW1 is pressed).

An output terminal of the differential amplifier 74 connects to an input terminal of a comparator 78, and an output terminal of the comparator 78 as well as the output terminal of the comparator 67 connect to one electrode terminal of a condenser 80. The other electrode terminal of the condenser 80 connects to clear (reset) terminals (CLR) of the input-output circuits 54, 60. The output of the comparator 78 resets the input-output circuits 54, 60 at the same time.

Specifically, the input-output circuits 54, 60 are reset while the seesaw switch 22 is operated and on completion of the quick zooming returning action. The quick zooming completes when the position stored in the condenser 72 corresponds to the position detected by the potentiometer 44.

The input-output circuits 54, 60 are composed of up-edge type up counters and they output voltage signals to output terminals (Q) according to input signals supplied to input terminals (CK). When clear terminals (CLR) receive reset signals, the output thereof become 0.

The output of the input-output circuit 54 is also transmitted to the rate adjustment circuit 52. While the input-output circuit 54 outputs a high-level (H) output signal, the maximum rate setting by the maximum zoom rate adjustment control 34 is cancelled and the maximum zoom rate is set at a preset zoom rate (e.g., the rate equivalent to the maximum value which can be set by the maximum zoom rate control 34).

The zooming is performed at the preset zoom rate during the quick zooming responsive to the operation of the switch SW1, in other words, the zooming in accordance with the telephoto signal from the voltage terminal (+V2) and the returning action to the zoom position stored in the condenser 72.

A description will be given of the operation of the taking lens drive unit which is constructed in the above-mentioned manner.

Figure 4:
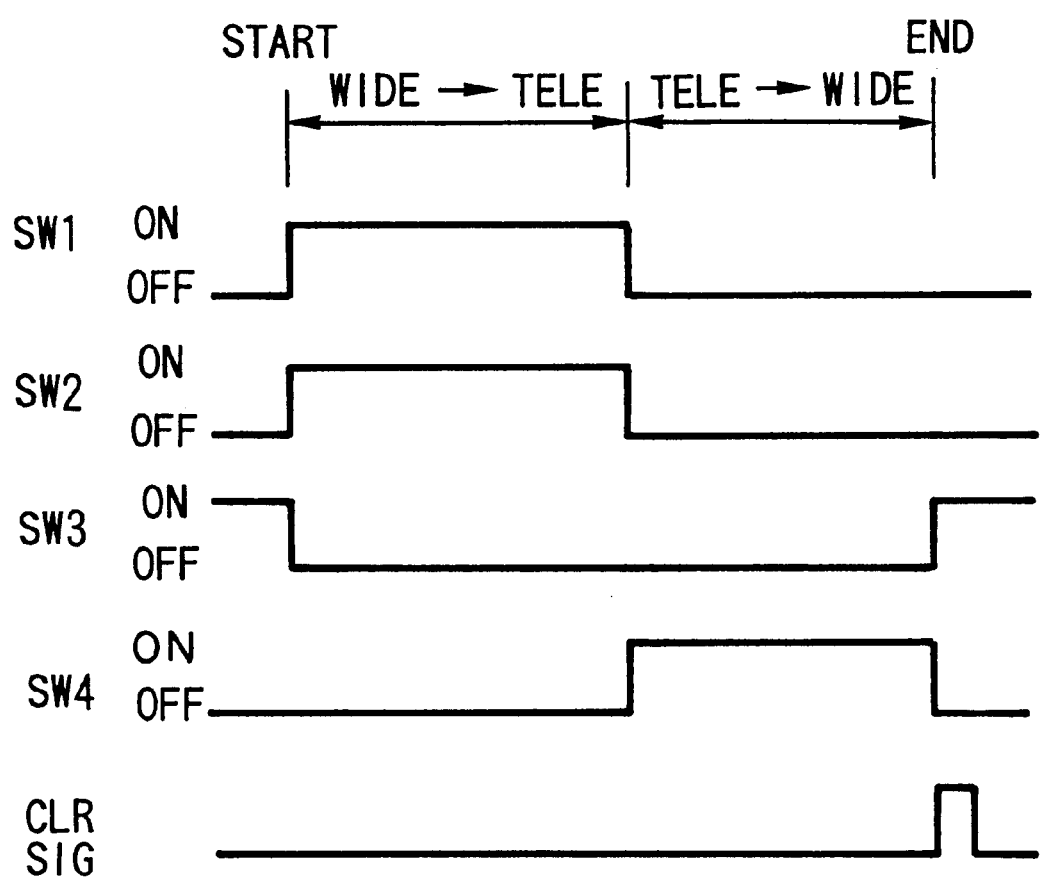
FIG. 4 is a timing chart of the circuit diagram of FIG. 3.

FIG. 4 is a timing chart of the SW1–SW4 in FIG. 3. In the normal state (not operated), the switches SW1, SW2, SW4, SW5 are OFF and the switch SW3 is ON.

In response to the operation of the seesaw switch 22, the output of the potentiometer 42 is transmitted to the rate adjustment circuit 52 to run the zoom drive motor 40. The zooming is performed at a zoom rate which conforms to the pressed amount of the seesaw switch 22 with the maximum rate set by the maximum rate control 34 being the upper limit. During that time, the potentiometer 44 regularly detects the zoom position.

When the seesaw switch 22 is operated, the switch SW5 in FIG. 3 is turned off, and thus, even if the switch SW1 is pressed during the operation of the seesaw switch 22, the output of the NOT gate 48 never changes. In other words, during the operation of the seesaw switch 22, the pressing of the switch SW1 is invalid and the seesaw switch 22 takes priority over the switch SW1.

When the operation of the seesaw switch 22 is cancelled, the zoom drive motor 40 is stopped and the switch SW5 is turned on again.

Next, when the switch SW1 is pressed, the output of the NOT gate 48 becomes high level, the switch SW2 is turned on, and the switch SW3 is turned off (see FIG. 4). When the switch SW3 is turned off, the zoom position (the zoom position when the switch SW1 is pressed) is stored in the condenser 72. When the switch SW2 is turned on, the telephoto signal is transmitted from the voltage terminal (+V2) to the rate adjustment circuit 52.

The taking lens moves toward the telephoto end in accordance with the telephoto signal from the voltage terminal (+V2). At this time, the rate setting by the maximum rate adjustment control 34 is cancelled to move the taking lens at the preset zoom rate for the quick zooming.

When the switch SW1 is released and the switch SW1 is turned off, the switch SW2 is turned off and the switch SW4 is turned on. This applies the differential output of the differential amplifier 74 to the rate adjustment circuit 52 to run the zoom drive motor 40, which moves the taking lens toward the wide end. When the detection signal from the potentiometer 44 corresponds to the signal level of the zoom position stored in the condenser 72, the reset signals are transmitted to the input-output circuits 54, 60, the switch SW4 is tuned off and the switch SW3 is turned on. When the taking lens returns to the original position stored in the condenser 72, the quick zooming function is cancelled.

If the seesaw switch 32 is operated while the quick zoom switch 32 (switch SW1) is pressed or while the taking lens is returned to the original position in the quick zooming, the output of the comparator 67 transmits the reset signals to the input-output circuits 54, 60 to cancel the quick zooming function, validating the operation of the seesaw switch 22.

Figure 5:
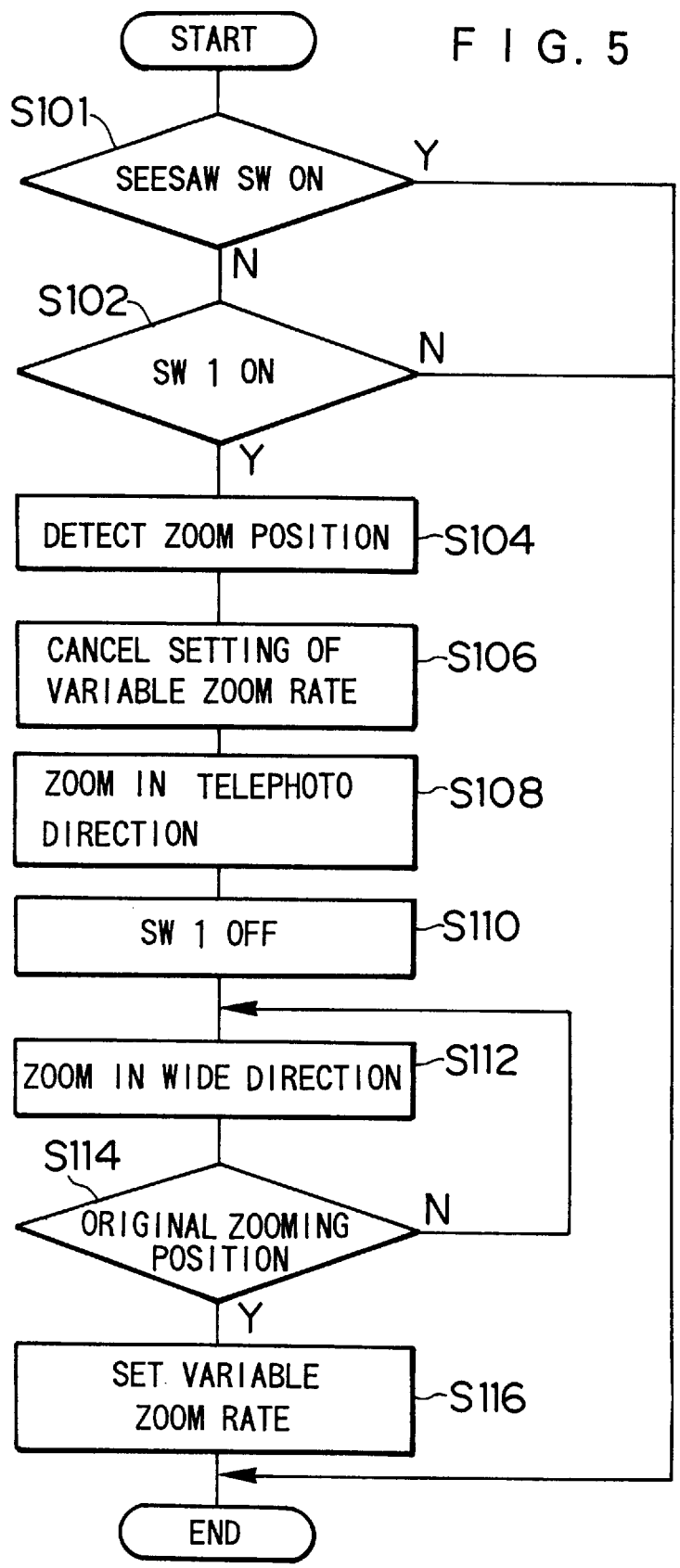
FIG. 5 is a flow chart showing the flow of quick zooming.

FIG. 5 shows the flow of the quick zooming performed by the taking lens drive unit. During the quick zooming, it is first determined whether the seesaw switch 22 is operated or not (step S101). If the seesaw switch 22 is ON, the quick zoom function does not work, and the zooming is performed according to the operation of the seesaw switch 22.

On the other hand, if the seesaw switch 22 is OFF at the step S101, it is determined whether the switch SW1 is operated or not (step S102). If the switch SW1 is OFF, the quick zooming function does not work. If the switch SW1 is ON, the quick zooming function works.

Specifically, the zoom position when the switch SW1 is pressed is detected and stored (step S104), and the rate setting by the maximum rate control 34 is cancelled (step S106) to zoom the taking lens in the telephoto direction at the preset zoom rate (step S108).

When the switch SW1 is turned off (step S110), the taking lens is zoomed in the wide direction (step S112). The taking lens is zoomed in the wide direction until the taking lens reaches the zoom position (the original zoom position) stored at the step S104 (step S114). When the taking lens reaches the original zoom position, the zooming is stopped. On completion of the above-described returning action, the rate setting by the maximum rate adjustment control 34 is validated (step S116) to complete the quick zooming.

The order of the steps S101 and S102 may be changed. Specifically, before it is determined whether the seesaw switch 22 is operated or not, it may be determined whether the switch SW1 is operated or not.

In this embodiment, the taking lens is zoomed in the telephoto direction by pressing the quick zoom switch 32, but the taking lens may also be zoomed in the wide direction.

A description will now be given of the second embodiment of the present invention.

Figure 6:
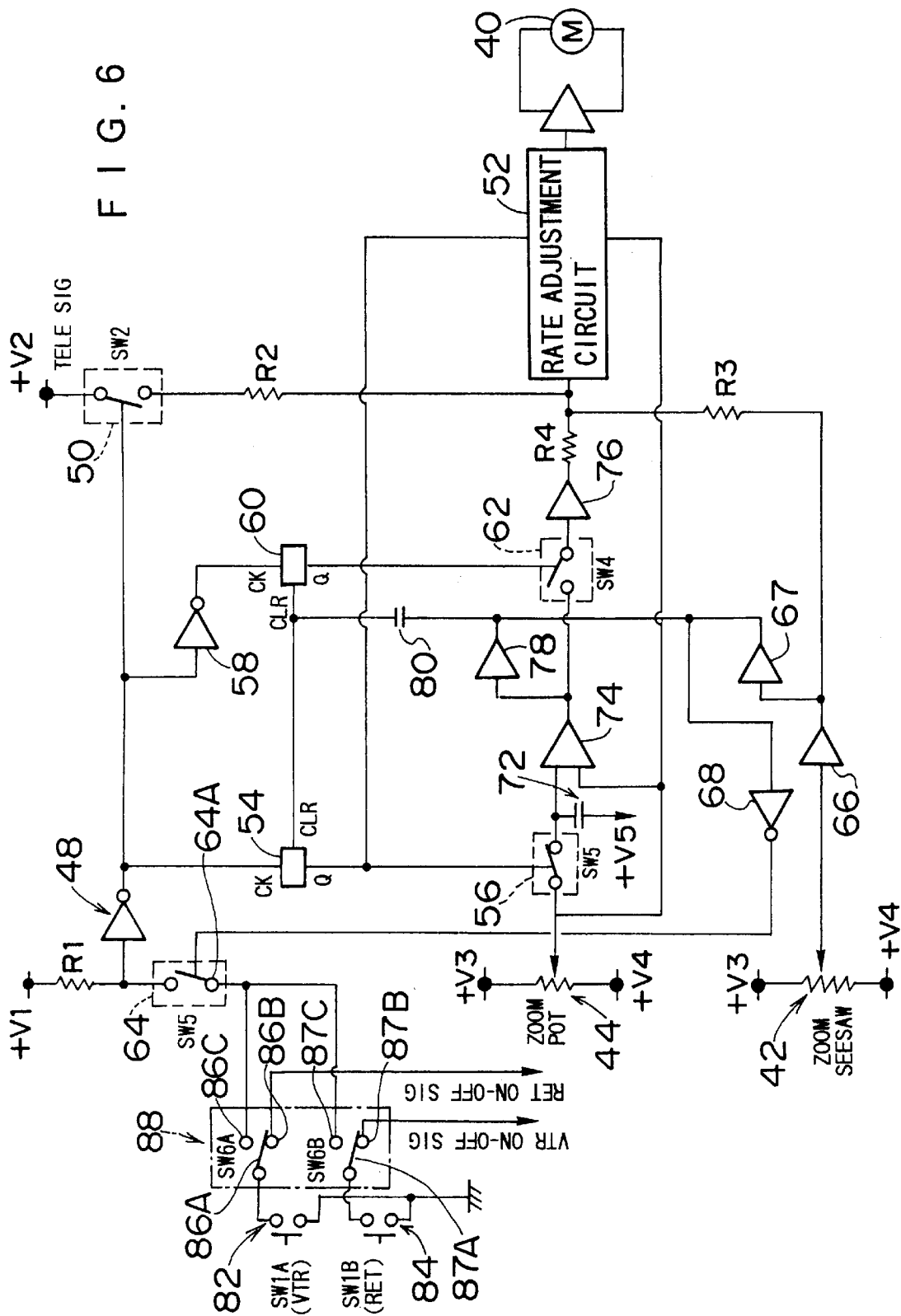
FIG. 6 is a circuit diagram of the taking lens drive unit showing the second embodiment.

FIG. 6 shows the structure of the taking lens drive unit according to the second embodiment of the present invention. Parts similar to those described with reference to FIG. 3 are designated by the same reference numerals, and they will not be explained.

The drive unit of the second embodiment substitutes a switch SW1A (82 in FIG. 6) equivalent to the VTR switch 30 and a switch SW1B (84 in FIG. 6) equivalent to the return switch 26 for the switch SW1 in FIG. 3. As shown in FIG. 6, a terminal 64A of the switch SW5, indicated by reference numeral 64, connects in parallel to a switch SW1A and a switch SW1B through changeover switches SW6A, SW6B provided with movable contact pieces indicated by reference numerals 86A, 87A.

The changeover switches SW6A and SW6B are constructed by a slide switch 88. Sliding a control member (not illustrated) changes where the contact pieces 86A, 87A connect, and sets one state among the first state wherein the switches SW1A and SW1B can be used as the VTR switch and the return switch, respectively, the second state wherein the switch SW1A can be used as the quick zoom switch and the switch SW1B is used as the return switch, and the third state wherein the switch SW1A can be used as the VTR switch and the switch SW1B is used as the quick zoom switch.

The return switch 26 is operated to project an image (e.g., an image on air), which is captured by another cameraman, on the viewfinder of the TV camera. The return switch is used frequently during the indoor shooting at a studio, etc., whereas it is rarely used during the shooting on location. To the contrary, the VTR switch 30 is rarely used at the studio, etc., whereas it is used frequently during the shooting on location.

In this embodiment, the return switch 26 and the VTR switch 30 are used as the quick zoom switch, a switch means relating to another function may also be used as the quick zoom switch.

In the taking lens drive unit which is constructed in the above-mentioned manner, when the control member of the slide switch 88 is operated to set the first state, the movable contact pieces 86A, 87A connect to the contacts 86B, 87B, respectively, and a signal from the switch SW1A is transmitted as an ON/OFF signal for VTR control to a VTR control input terminal of a camera circuit (not illustrated). On the other hand, a signal from the switch SW1B is transmitted as an ON/OFF signal for return control to a return input terminal of a camera circuit (not illustrated). Thus, if the first state is selected, the switches SW1A and SW1B function as the VTR switch and the return switch, respectively.

When the control member of the slide switch 88 is operated to select the second state, the movable contact piece 86A connects to the contact 86C and the movable contact piece 87A connects to a contact 87B. The signal from the switch SW1B is transmitted as the ON/OFF signal for the return control to the return input terminal of the camera circuit (not illustrated, and the signal from the SW1A is transmitted is used as the signal of the quick zoom switch independently of the VTR control circuit.

In the above-mentioned state, the switch SW1B functions as the return switch, and the switch SW1A functions as the quick zoom switch. The second state is preferably selected for the shooting at the studio, etc.

When the control member of the slide switch 88 is operated to select the third state, the movable contact piece 86A connects to the contact 86B and the movable piece 87A connects to the contact 87C. A signal from the switch SW1A is transmitted as the ON/OFF signal for the VTR control to a VTR control input terminal of the camera circuit, and a signal from the switch SW1B is used as the signal of the quick zoom switch independently of the return control circuit.

In the above-mentioned state, the switch SW1A functions as the VTR switch, and the switch SW1B functions as the quick zoom switch. The third state is preferably selected for the shooting on location.

In the embodiment shown in FIG. 6, there must be provided a member which is equivalent to the slide switch 88 in view of the appearance of the apparatus, but the quick zoom switch 32 in FIG. 1 may be omitted. Since it is relatively easy to attach the slide switch 88 to the body of the apparatus, the apparatus is easier and less expensive to manufacture than the apparatus provided with the special quick zoom switch 32 shown in FIG. 1.

As set forth hereinabove, according to the taking lens drive unit of the present invention, the taking lens drive unit has the first control means which designates the zooming direction and the zoom rate and the second control means which executes/cancels the zooming in the telephoto or wide direction at the preset zoom rate, is provided with the prioritizing means which gives priority to the first control means over the second control means. For this reason, even if the second control means is operated while the first control means is operated, the operation of the second control means is invalid and the first control means continues its operation. This prevents the shooting caused by the erroneous operation of the second control means.

At the time of zooming (quick zooming) in accordance with the executing/canceling operation of the second control means, the setting of the maximum zoom rate is cancelled to zoom the taking lens at the specific set rate (the preset zoom rate). For this reason, the zooming can be performed quickly by operating the second control means regardless of the setting of the maximum zoom rate.

The control member relating to other functions such as the return switch and the VTR start switch is substituted for the control member of the second control means, and the changeover means switches the functions as the need arises. This eliminates the necessity for providing the control member only for the second control means, and it is therefore easier and less expensive to manufacture the apparatus.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A taking lens drive unit which drives a movable lens system of a taking lens forward and backward along an optical axis with a zoom drive motor to perform zooming, said taking lens drive unit comprising:

first control means for controlling a zooming direction and a zoom rate;

second control means for executing/canceling the zooming in a preset zooming direction at a preset zoom rate;

storage means for storing a zoom position when said second control means is operated to execute the zooming;

returning means for returning said movable lens system of said taking lens to the zoom position stored in said storage means in response to the canceling operation of said second control means; and prioritizing means for giving priority to the operation of said first control means over the operation of said second control means when said first control means is operated prior to said second control means.

2. The taking lens drive unit as defined in claim 1, further comprising:

setting means for setting the maximum zoom rate; and zoom rate adjusting means for adjusting the zoom rate in response to the operation of said first control means with the maximum zoom rate set by said setting means being the upper limit, and canceling the setting of said setting means at the time of zooming operation performed according to the execution/canceling of said second control means, thereby adjusting the zoom rate to said preset zoom rate.

3. The taking lens drive unit as defined in claim 1, wherein:

said first control means is composed of a seesaw switch which is capable of swinging, said first control means indicating the zooming direction with the operating direction of said seesaw switch and indicating the zoom rate with the operated amount of said seesaw switch; and said second control means is composed of a button switch, and pressing said button switch causes the zooming to be executed in said preset zooming direction at said preset zoom rate, and releasing said button switch causes said returning means to return said movable lens system of said taking lens to the zoom position stored in said storage means.

4. The taking lens drive unit as defined in claim 1, wherein said preset zooming direction is set in a telephoto direction.

5. The taking lens drive unit as defined in claim 1, wherein a control member of said second control means also serves as a control member of a switch means relating to another function, said taking lens drive unit further comprising changeover means for switching the state of using said control member between the state of using said control member as said second control means and the state of using said control member as said switching means relating to said another function.

6. A taking lens drive unit which drives a movable lens system of a taking lens forward and backward along an optical axis with a zoom drive motor to perform zooming, said taking lens drive unit comprising:

a first control for controlling a zooming direction and a zoom rate;

a second control for executing/canceling the zooming in a preset zooming direction at a preset zoom rate;

a memory for storing a zoom position when said second control means is operated to execute the zooming;

a return circuit for returning said movable lens system of said taking lens to the zoom position stored in said memory in response to the canceling operation of said second control; and a prioritizing circuit, connected to said first control and said second control, for giving priority to the operation of said first control over the operation of said second control when said first control is operated prior to said second control.

7. A method for driving a movable lens system of a taking lens forward and backward along an optical axis with a zoom drive motor to perform zooming, said method comprising:

controlling a zooming direction and a zoom rate;

executing/canceling the zooming in a preset zooming direction at a preset zoom rate;

storing a zoom position when said second control means is operated to execute the zooming;

returning said movable lens system of said taking lens to the zoom position stored in said storage step in response to the canceling operation of the zooming in the present zooming direction at the preset zoom rate; and giving priority to the controlling step over the executing step when said controlling step is initiated prior to said executing step.

8. A taking lens drive unit which drives a movable lens system of a taking lens forward and backward along an optical axis with a zoom drive motor to perform zooming, said taking lens drive unit comprising:

first control means for controlling a zooming direction and a zoom rate;

second control means for executing/canceling the zooming in a preset zooming direction at a preset zoom rate;

storage means for storing a zoom position when said second control means is operated to execute the zooming;

returning means for returning said movable lens system of said taking lens to the zoom position stored in said storage means in response to the canceling operation of said second control means; and invalidating means for invalidating operation of said second control means when said first control means is operated prior to said second control means.

9. A taking lens drive unit which drives a movable lens system of a taking lens forward and backward along an optical axis with a zoom drive motor to perform zooming, said taking lens drive unit comprising:

a first control for controlling a zooming direction and a zoom rate;

a second control for executing/canceling the zooming in a preset zooming direction at a preset zoom rate;

a memory for storing a zoom position when said second control means is operated to execute the zooming;

a return circuit for returning said movable lens system of said taking lens to the zoom position stored in said memory in response to the canceling operation of said second control; and an invalidating circuit, connected to said first control and said second control, for giving invalidating to the operation of said second control when said first control is operated prior to said second control.

10. A method for driving a movable lens system of a taking lens forward and backward along an optical axis with a zoom drive motor to perform zooming, said method comprising:

controlling a zooming direction and a zoom rate;

executing/canceling the zooming in a preset zooming direction at a preset zoom rate;

storing a zoom position when said second control means is operated to execute the zooming;

returning said movable lens system of said taking lens to the zoom position stored in said storing step in response to the canceling operation of the zooming in the preset zooming direction at the present zoom rate; and invalidating the executing step when said controlling step is initiated prior to said executing step.

* * * * *